United States Patent [19]

Hüttlin

[11] Patent Number: 4,736,895

[45] Date of Patent: Apr. 12, 1988

[54] FLUIDIZED BED APPARATUS

[76] Inventor: Herbert Hüttlin, Daimlerstrasse 7, 7853 Steinen, Fed. Rep. of Germany

[21] Appl. No.: 894,802

[22] Filed: Aug. 8, 1986

[30] Foreign Application Priority Data

Aug. 28, 1985 [DE] Fed. Rep. of Germany ....... 3530744

[51] Int. Cl.$^4$ ..................... B02C 19/06; F26B 17/00
[52] U.S. Cl. .......................... 241/40; 241/41; 241/57; 34/57 R; 34/57 A; 34/57 E; 366/101
[58] Field of Search ................ 241/39, 38, 40, 41, 241/42, 43, 57; 34/57 E, 57 R, 57 A; 118/19, 20, 24, 62, 303; 366/101, 102, 106, 107

[56] References Cited

U.S. PATENT DOCUMENTS

| 1,699,441 | 1/1929 | Negro ............................. 241/40 X |
| 2,786,280 | 3/1957 | Gishler et al. . |
| 3,204,942 | 9/1965 | Matthys et al. . |
| 3,334,868 | 8/1967 | Lage . |
| 3,385,724 | 5/1968 | Grün . |
| 3,386,182 | 6/1968 | Lippert . |
| 3,411,480 | 11/1968 | Grass, Jr. et al. . |
| 4,002,325 | 1/1977 | Herfeld . |
| 4,050,406 | 9/1977 | Reni . |
| 4,168,914 | 9/1979 | Larson et al. . |
| 4,217,851 | 8/1980 | Biehl et al. . |
| 4,425,865 | 1/1984 | Hörner et al. . |
| 4,466,082 | 8/1984 | Zoschak et al. . |
| 4,587,744 | 5/1986 | Hüttlin . |

FOREIGN PATENT DOCUMENTS

| 0103894 | 9/1983 | European Pat. Off. . |
| 872928 | 4/1953 | Fed. Rep. of Germany . |
| 38538 | 1/1960 | Fed. Rep. of Germany . |
| 1849891 | 1/1961 | Fed. Rep. of Germany . |
| 1577729 | 9/1965 | Fed. Rep. of Germany . |
| 1297447 | 6/1966 | Fed. Rep. of Germany . |
| 1632404 | 2/1970 | Fed. Rep. of Germany . |
| 2299903 | 10/1976 | France . |
| 264592 | 9/1946 | Switzerland . |
| 2043219 | 1/1979 | United Kingdom . |

Primary Examiner—Timothy V. Eley
Attorney, Agent, or Firm—Brumbaugh, Graves, Donohue & Raymond

[57] ABSTRACT

A substantially spherical vessel (10) the lower part (16) of which opens into a cylindrical wall (36) of a dish (24) arranged below the vessel (10) is provided for mixing, drying, granulating, pelleting, varnishing, and/or coating pulverous or granular material (30). An immersion tube (40) protrudes from above into the vessel (10), being immersed in the dish (24) such that a narrow annular space (42) is defined in the dish. The annular space (42) has a mean diameter (D42) which conforms to the mean diameter of the maximum free ring cross section in the equatorial plane of the vessel (10). In the upper area of the vessel (10) a diverting shield (44) is arranged rotationally symmetrically around the immersion tube (40). The diverting shield (44) vaults symmetrically over the annular space (42). Any gas introduced from above into the dish (24) is deflected in upward direction, flowing through the annular space (42) into the vessel (10) where the material (30) is fluidized in two concentric toroidal vortices.

13 Claims, 1 Drawing Sheet

FLUIDIZED BED APPARATUS

BACKGROUND OF THE INVENTION

The instant invention relates to a fluidized bed apparatus for mixing, drying, granulating, pelleting, varnishing, and/or coating pulverous or granular material, comprising a vessel which is at least approximately rotationally symmetrical with respect to an at least approximately vertical axis of the vessel and includes a lower part having a downwardly decreasing diameter, a dish which is at least approximately rotationally symmetrical with respect to the axis of the vessel and includes an at least approximately cylindrical wall into which opens the lower part of the vessel, an immersion tube protruding axially from above into the vessel and being immersed in the dish such that a narrow annular space is defined between the immersion tube and the cylindrical wall of the dish, and a diverting shield arranged at least approximately rotationally symmetrically around the immersion tube in an upper area of the vessel, gas introduced from above into the dish being deflected upwardly by the same, flowing through the annular space into the vessel and moving material contained therein, especially fluidizing the same, and the material entrained further in upward direction by the gas being deflected again by the diverting shield.

In a known fluidized bed apparatus of this kind (EP-A-0 103 894) the narrow annular space within the dish has a mean diameter which is much smaller than the mean diameter of the maximum free ring cross section of the vessel. The flow of gas exiting from the annular space in upward direction into the vessel entrains the material upwardly all around the immersion tube. It is deflected outwardly by the diverting shield and moved once more into the vicinity of the dish along the downwardly converging inner wall of the lower part of the vessel. From this location the material is entrained again in upward direction all around the immersion tube. This results in uniform rolling over of the material contained in the vessel. If the flow velocity of the gas is sufficient, this rolling motion passes over into a kind of complete fluidization of the material.

SUMMARY OF THE INVENTION

It is an object of the instant invention to develop a fluidized bed apparatus of the kind defined such that it will permit even more thorough mixing and whirling of the material.

This object is met, in accordance with the invention, in that the annular space has a mean diameter which conforms at least approximately to the mean diameter of the maximum free cross section of the vessel between the annular space and the diverting shield, and the diverting shield vaults at least approximately symmetrically over the annular space.

In this manner the flow of gas entering into the vessel and consequently also any material entrained by the gas stream form two coaxial, toroidal vortices, namely an inner vortex with which the gas stream and the entrained material are deflected radially inwardly at the diverting shield so as to flow downwardly all around the immersion tube, and an outer vortex which is deflected radially outwardly at the diverting shield so as to flow downwardly along the inner wall of the lower part of the vessel. The two vortices meet again in the range above the narrow annular space, and a limited exchange of particles of the material may take place between the two vortices on their common way to the top.

In a preferred embodiment of the invention the known feature of the diverting shield being concavely arched in downward direction is developed further in that two concentric, annular vaults at the underside of the diverting shield form an annular rib the diameter of which likewise conforms at least approximately to the mean diameter of the maximum free ring cross section of the vessel. This results in a particularly smooth deflection of both vortices at the diverting shield.

In agreement with the known fluidized bed apparatus of the generic kind in question, the apparatus according to the invention comprises a gas outlet, preferably disposed above the diverting shield. In this case it is especially advantageous in accordance with the invention if two annular passages at least approximately of the same size are left free between the diverting shield and the immersion tube, on the one hand, and the inner wall of the vessel, on the other hand.

The fluidized bed apparatus according to the invention may further agree with the known apparatus of the kind specified in the preamble in that a plurality of nozzles are disposed around the immersion tube to spray liquids and/or solids into the vessel. In this case another feature of the invention preferably provides that the axes of the nozzles are arranged at least approximately on an imaginary cylinder jacket having a diameter which corresponds to the mean diameter of the maximum free ring cross section of the vessel. Conveniently, the nozzles are disposed inside the annular space and directed upwardly in parallel with the axis of the vessel.

In further agreement with the known fluidized bed apparatus of the generic kind in question, the immersion tube may have an outer generated surface which comprises a downwardly flaring portion and an at least approximately cylindrical portion immersed into the dish below said portion. This embodiment may be developed further in accordance with the invention in that the flaring portion has a trumpet-like profile extending at least approximately symmetrically with respect to the lower part of the vessel in the axial half section through the vessel. This serves to further improve the symmetry aimed at by the invention of the profiles of the two coaxial vortices.

BRIEF DESCRIPTION OF THE DRAWINGS

The invention will be described further, by way of example, with reference to the accompanying drawings, in which.

DETAILED DESCRIPTION OF THE INVENTION

Figure 1:
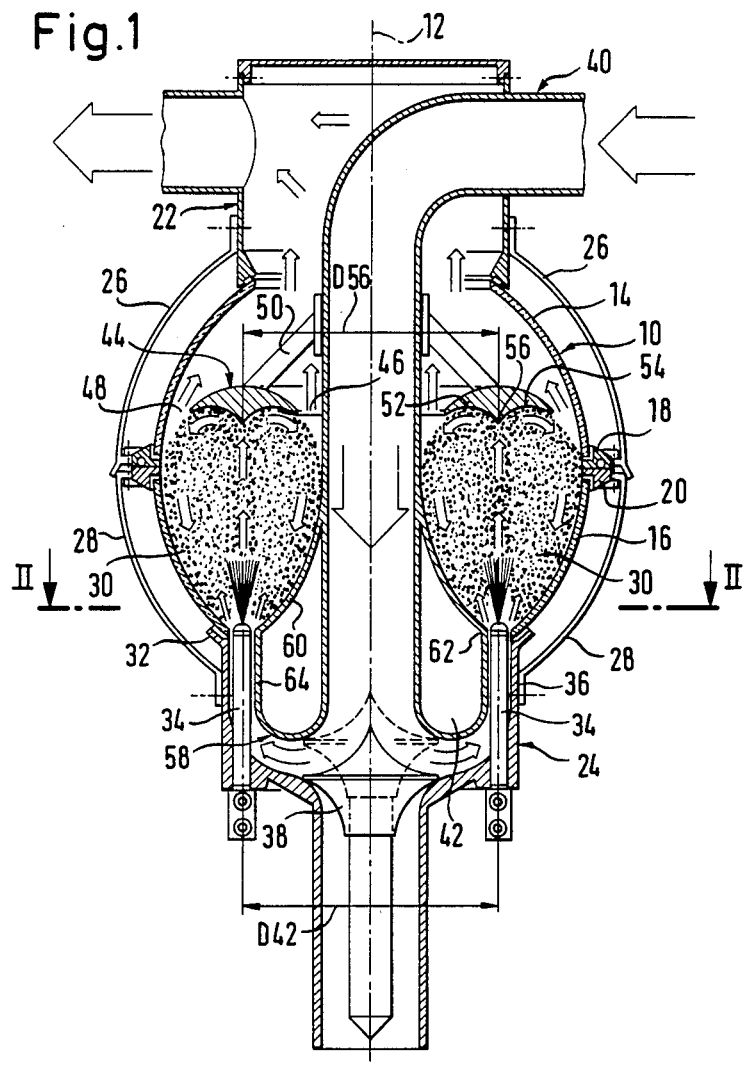
FIG. 1 is a vertical axial section of a fluidized bed apparatus according to the invention.
Figure 2:
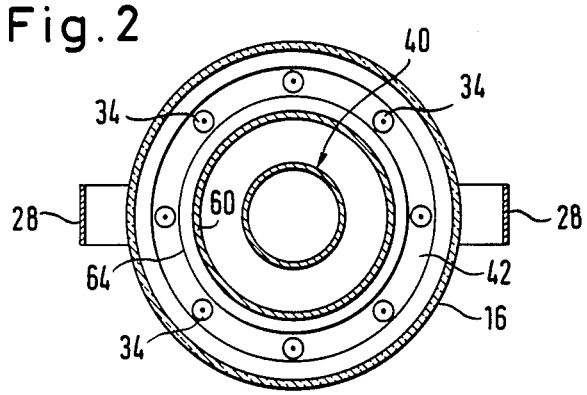
FIG. 2 is a cross sectional elevation along line II—II in FIG. 1.

The fluidized bed apparatus shown comprises a substantially spherical vessel 10 and on the whole is substantially rotationally symmetrical with respect to a vertical axis 12 of the vessel. The vessel 10 consists of an upper part 14 and a lower part 16 each having the configuration of a cupshaped spherical zone, substantially being made of glass, and having flanges 18 and 20 which abut each other in sealing fashion.

The upper part 14 of the vessel is followed in upward direction by a container top 22, whereas the lower part 16 merges in downward direction into a dish 24. Two clamps 26 and 28 each are fixed to the container top 22 and to the dish 24, respectively. They are interconnected by being braced, for example, by conventional past-dead center catches or similar quick-release closures permitting the parts 14 and 16 of the vessel to be disassembled quickly for cleaning. During such procedure a carrier structure (not shown) of any desired type continues to support either the upper part 14 of the vessel by way of the container top 22 or the lower part 16 by way of the dish 24.

The vessel 10 contains pulverous or granular material 30 which is being mixed or dried or granulated or pelleted or varnished or coated or subjected to a combination of two or more of these procedures. FIG. 1 shows the material 30 in fluidized state which occurs during operation of the apparatus.

The dish 24 has an outwardly projecting, upper edge 32 enclosing the lower edge of the lower part 16 of the vessel.

A plurality of nozzles, eight nozzles 34 in the embodiment shown, open at the level of the upper edge 32. They are inserted from below into the dish 24 and extend parallel to the axis 12 of the vessel in upward direction, this being vertically in the embodiment shown. The nozzles 34 may be designed to spray a liquid, such as sugar solution on the material 30. They may likewise be designed as nozzles for solids to spray in the material 30 or as nozzles for multiple substances for the simultaneous spraying of liquids and/or solids and/or gases. At any rate, the nozzles 34 are disposed offset with respect to each other at uniform angular spacings.

The upper edge 32 of the dish 24 is followed in downward direction by a cylindrical wall 36 which in turn is followed by a deflecting zone formed in part by the dish 24 itself and in part by a closure member 38 which is adjustable in height within the dish. Both the closure member 38 and the dish 24 are generally rotationally symmetrical, and the closure member has an axially upwardly directed tip.

In FIG. 1 the closure member 38 is shown in full lines in its operative position in which it tightly seals the dish 24 towards the bottom. The closure member 38 may be lifted from this position into an opening position indicated in discontinuous lines. With the closure member in this position, the material 30 may flow out through the dish 24 in downward direction.

An immersion tube 40 passes inwardly in an arch through the container top 22 and then extends axially in the vessel 10 in downward direction to terminate just above the bottom of the dish 24. Together with the cylindrical wall 36 thereof it defines a cylindrical, annular space 42. The outer end of the immersion tube 40 is adapted to be connected to the pressure end of a blower conveying air or another gas through the apparatus. The blower does not belong to the fluidized bed apparatus as such and may be of conventional design. For these reasons it is not shown.

An annular diverting shield 44 is fixed to the immersion tube 40 inside the upper part 14 of the vessel. The edges of this diverting shield lie in a common plane which is normal to the axis 12 of the vessel, thus being a horizontal plane in the embodiment shown. Between these edges and the immersion tube 40, on the one hand, and the inner wall of the vessel 10, on the other hand, an annular passage 46 and 48 each is left free. The surface areas defined by these two passages 46 and 48 are approximately of the same size so that in operation approximately the same quantities of gas per unit time may flow radially within and without past the diverting shield 44 in upward direction into the container top 22 which is adapted to be connected to the suction end of the blower.

The fixing of the diverting shield 44 at the immersion tube 40 is adjustable in height whereby the surface area ratio of the passages 46 and 48 is variable. The width of the inner passage 46 is independent of the adjustment in height, whereas the width of the outer passage 48 decreases at increasing height of the diverting shield 44, and vice versa. The fixing of the diverting shield 44 is so designed that the flow of gas through the passage 46 in upward direction is not obstructed to any extent worth mentioning, spokes 50 being used in the embodiment shown.

The underside of the diverting shield 44 is composed of two annular vaults 52 and 54 which together form an annular rib 56 projecting downwardly. The common axis of both vaults 52 and 54 and of the rib 56 coincides with the axis 12 of the vessel. The cross sectional profile of the diverting shield 44 is symmetrical with respect to the rib 56.

In the embodiment shown the immersion tube 40 has a constant diameter almost for its full length, approximately up to a horizontal plane in which the tip of the closure member 38 is located when the latter is in its closing position. In this plane the immersion tube 40 passes over into a marginal bead 58. This marginal bead 58 has an upper portion 60 beginning in the equatorial plane of the vessel 10 where it has an outer diameter in agreement with the outer diameter of the immersion tube 40. From this plane it flares like a trumpet in downward direction until it reaches an annular edge 62 located at the level of the lower edge of the lower part 16 of the vessel. At edge 62 a cylindrical portion 64 of the marginal bead 58 begins. This portion 64 constitutes the radially inner definition of the annular space 42.

The vessel 10 has a maximum free ring cross section located in the equatorial plane of the vessel in which plane the flanges 18 and 20 abut each other. That maximum free ring cross section has a mean diameter which results as the arithmetic mean value of the maximum inner diameter of the vessel 10 and the outer diameter of the immersion tube. The annular spaces 42 has a mean diameter D42 which results as the arithmetic mean value of the inner diameter of the cylindrical wall 36 of the dish 24 and the outer diameter of the cylindrical portion 64 of the marginal bead 58 and conforms exactly to the mean diameter of the maximum free ring cross section of the vessel 10. The diameter D56 of the rib 56 is just as great.

In operation the above mentioned blower sucks air or an inert gas in heated, dry condition in the direction of the arrows shown in FIG. 1 through the apparatus shown, while pressure below ambient pressure may prevail in the interior of the vessel. Pulverous, solid, and liquid substances are sprayed simultaneously or alternatingly through the nozzles 34. These substances deposit on the material 30 before they reach any wall of the apparatus. For this reason they have no chance of accumulating on the inner wall of the vessel 10 or the immersion tube 40 or the diverting shield 44. The apparatus shown thus is especially well suited for spraying substances which otherwise are difficult to process.

What is claimed is:

1. A fluidized bed apparatus for treating granular and pulverulant material comprising:
   (a) a vessel having a hollow interior, said vessel bieng substantially rotationally symmetric about a substantially vertical axis, and the diameter of said interior decreasing in a lower portion of the vessel;
   (b) a dish formed from a substantially cylindrical wall and attached to the bottom of the vessel so as to be substantially rotationally symmetric with respect to the axis, said wall defining an interior of the dish which is contiguous with the interior of the vessel;
   (c) an immersion tube protruding axially into the vessel and ending in the interior of the dish such that a narrow annular space is created between the immersion tube and the wall of the dish, said immersion tube being connectable to a source of gas such that gas will flow through the immersion tube into the dish and then be deflected by the dish to flow upward through the annular space into the vessel so as to move material within the vessel;
   (d) a diverting shield disposed substantially symmetrically around the immersion tube in the interior of the vessel and forming a curved cover disposed substantially over the annular space such that material being moved in an upward direction by the gas is again deflected by the diverting shield, wherein the immersion tube, the diverting shield and the vessel together delimit a substantially toroidal open space within the vessel having a maximum mean diameter, and wherein the annular space has a mean diameter that conforms substantially to the maximum mean diameter of the toroidal open space.

2. The fluidized bed apparatus as claimed in claim 1, wherein the diverting shield is concave on a downward facing surface and has two concentric, annular arches on its underside which form an annular rib the diameter of which also conforms substantially to the maximum mean diameter of the toroidal open space.

3. The fluidized bed apparatus as claimed in claims 1 or 2, wherein the diverting shield and the immersion tube are disposed within the vessel such that two annular passages of substantially the same size are formed between the diverting shield and the immersion tube and between the diverting shield and the vessel, respectively.

4. The fluidized bed apparatus as claimed in claim 3, further comprising a plurality of nozzles to spray liquids or solids into the vessel, wherein the axes of the nozzles are arranged substantially on an imaginary cylinder having a diameter that corresponds to the maximum mean diameter of the toroidal open space.

5. The fluidized bed apparatus as claimed in claim 4, wherein the nozzles are arranged within the annular space and directed upwardly parallel to the axis of the vessel.

6. The fluidized bed apparatus as claimed in claim 5, wherein the immersion tube has an outer rotationally generated surface that comprises a downwardly flaring portion and a substantially cylindrical flaring portion immersed into the dish below said flaring portion, wherein the flaring portion has a trumpet-like profile which is substantially a mirror image of the vessel in the region of decreasing diameter.

7. The fluidized bed apparatus as claimed in claim 4, wherein the immersion tube has an outer rotationally generated surface that comprises a downwardly flaring portion and a substantially cylindrical flaring portion immersed into the dish below said flaring portion, wherein the flaring portion has a trumpet-like profile which is substantially a mirror image of the vessel in the region of decreasing diameter.

8. The fluidized bed apparatus as claimed in claim 3, wherein the immersion tube has an outer rotationally generated surface that comprises a downwardly flaring portion and a substantially cylindrical portion immersed into the dish below said flaring portion, wherein the flaring portion has a trumpet-like profile which is substantially a mirror image of the vessel in the region of decreasing diameter.

9. The fluidized bed apparatus as claimed in claims 1 or 2, further comprising a plurality of nozzles to spray liquids or solids into the vessel, wherein the axes of the nozzles are arranged substantially on an imaginary cylinder having a diameter that corresponds to the maximum mean diameter of the toroidal open space.

10. The fluidized bed apparatus as claimed in claim 9, wherein the nozzles are arranged within the annular space and directed upwardly parallel to the axis of the vessel.

11. The fluidized bed apparatus as claimed in claim 10, wherein the immersion tube has an outer rotationally generated surface that comprises a downwardly flaring portion and a substantially cylindrical portion immersed into the dish below said flaring portion, wherein the flaring portion has a trumpet-like profile which is substantially a mirror image of the vessel in the region of decreasing diameter.

12. The fluidized bed apparatus as claimed in claim 9, wherein the immersion tube has an outer rotationally generated surface that comprises a downwardly flaring portion and a substantially cylindrical portion immersed into the dish below said flaring portion, wherein the flaring portion has a trumpet-like profile which is substantially a mirror image of the vessel in the region of decreasing diameter.

13. The fluidized bed apparatus as claimed in claims 7 or 8, wherein the immersion tube has an outer rotationally generated surface that comprises a downwardly flaring portion and a substantially cylindrical portion immersed into the dish below said flaring portion, wherein the flaring portion has a trumpet-like profile which is substantially a mirror image of the vessel in the region of decreasing diameter.

* * * * *

UNITED STATES PATENT AND TRADEMARK OFFICE
CERTIFICATE OF CORRECTION

PATENT NO. :  4,736,895
DATED       :  April 12, 1988
INVENTOR(S) :  Herbert Huttlin It is certified that error appears in the above-identified patent and that said Letters Patent is hereby corrected as shown below:

First page, 2nd Column, 2nd line, "Fed. Rep. of Germany" should read --East Germany--

Column 5, line 3, "bieng" should read --being--.

Signed and Sealed this

Fourth Day of October, 1988

Attest:

DONALD J. QUIGG

Attesting Officer

Commissioner of Patents and Trademarks